(12) United States Patent
Potthoff

(10) Patent No.: US 6,447,609 B1
(45) Date of Patent: Sep. 10, 2002

(54) PAINT SPRAYING APPARATUS

(75) Inventor: Bernhard Potthoff, Herzebrock-Clarholz (DE)

(73) Assignee: Venjakob Maschinenbau GmbH & Co. KG, Rheda-Wiedenbrück (DE)

( * ) Notice: Subject to any disclaimer, the term of this patent is extended or adjusted under 35 U.S.C. 154(b) by 0 days.

(21) Appl. No.: 09/497,064

(22) Filed: Feb. 2, 2000

(30) Foreign Application Priority Data

Feb. 12, 1999 (EP) .............................................. 99102637

(51) Int. Cl.⁷ .............................................. B65G 45/00
(52) U.S. Cl. ........................ 118/70; 118/322; 198/494; 198/497; 198/461.2
(58) Field of Search ................................ 118/322, 320, 118/70; 198/498, 494, 497, 461.1, 461.2

(56) References Cited

U.S. PATENT DOCUMENTS 4,076,231 A  2/1978 Kutzner et al.
5,421,448 A * 6/1995 Falcioni ....................... 198/498
5,733,376 A * 3/1998 Costello ....................... 118/668

FOREIGN PATENT DOCUMENTS

| EP | 0 571 697 A | 12/1993 |
| GB | 2 100 211 A | 12/1982 |
| WO | WO 94 02254 A | 2/1994 |

* cited by examiner

*Primary Examiner*—Laura Edwards
*Assistant Examiner*—Yewebdar T Tadesse
(74) *Attorney, Agent, or Firm*—Henry M. Feiereisen

(57) ABSTRACT

A paint spraying apparatus for coating an article with paint, enamel, lacquer or the like, includes a conveyor unit having an endless conveyor belt, trained over at least two drums, for transporting an article to be coated past a sprayer unit. Operatively connected to the conveyor unit is at least one cleaning unit for wiping a surface of the conveyor belt clean. The cleaning unit includes an endless wiping belt which extends obliquely relative to the conveyor belt and is so operated as to revolve at a higher speed than the conveyor belt when contacting the conveyor belt.

13 Claims, 5 Drawing Sheets

PAINT SPRAYING APPARATUS

CROSS-REFERENCES TO RELATED APPLICATIONS

This application claims the priority of European Patent Application Serial No. 99 102 637.8, filed Feb. 12, 1999, the subject matter of which is incorporated herein by reference.

BACKGROUND OF THE INVENTION

The present invention relates, in general, to a paint spraying apparatus, and more particularly to a paint spraying apparatus of a type including a conveyor unit having an endless conveyor belt, trained over at least two belt-reversing rollers, for transporting an article to be coated, and at least one cleaning unit operatively connected to the conveyor unit for wiping a surface of the conveyor belt clean.

In a paint spraying apparatus of this type, the conveyor belt is relatively wide and has no openings or breakthroughs. The application of paint, lacquer, enamel or like coats onto the articles is realized by controlled spay guns arranged above the conveyor unit. For sake of simplicity, the following description will refer to paint only, but it will be understood by persons skilled in the art, that other coats such as lacquer or enamel generally follow the concepts outlined here and thus are considered to be covered by this disclosure. As a consequence of the configuration of the conveyor belt, it is inevitable that gaps between successive articles will also be sprayed, thereby depositing a coat of paint on the conveyor belt. Therefore, the outside of the conveyor belt must be thoroughly cleaned immediately after removing the articles from the conveyor unit.

In order to keep the loss of paint to a minimum, it has been proposed to provide a paint spraying apparatus which is equipped with a paint recovery unit that essentially includes a cylinder in axis-parallel disposition to the rollers of the conveyor unit. The cylinder is driven in a same direction of rotation as the neighboring roller of the conveyor unit so that contacting surfaces of the roller and the cylinder move in opposite directions. Paint separated by the cylinder from the conveyor belt is subsequently scraped off the cylinder by strippers and collected in a gutter which is configured with a downward slope so that paint can flow by way of gravity into a subjacent tank when the paint is sufficiently fluid, or discharged laterally from the gutter by a mechanically operated slide. This, however, necessarily requires accumulation of a certain quantity of paint in the gutter so that some paint will dry on, thereby adversely affecting the recovery operation. In addition, as the cylinder extends across the entire width of the conveyor belt, the spray painting apparatus is complicated in structure and rather cost-intensive. Moreover, it is nearly impossible to sufficiently clean the conveyor belt when paint of relatively high viscosity, i.e. viscous or pasty paint, is processed.

Another conventional paint spraying apparatus uses for the transport of articles being coated a conveyor unit which is comprised of several extremely narrow conveyor belts. In the area of the spray guns, excess paint, so-called overspray, is received by a wiping belt which extends perpendicular to the conveyor unit and is cleaned by a stripping device. This paint spraying apparatus also suffers shortcomings as paint will deposit on the narrow transport belts, which therefore have to be cleaned.

SUMMARY OF THE INVENTION

It is thus an object of the present invention to provide an improved paint spraying apparatus, obviating the afore-stated drawbacks.

In particular, it is an object of the present invention to provide an improved paint spraying apparatus which is simple in structure and cost-efficient while yet realizes a sufficient cleaning of the conveyor belt, even when highly viscous or pasty as well as fast drying paints are processed.

These objects, and others which will become apparent hereinafter, are attained in accordance with the present invention by providing a conveyor unit having an endless conveyor belt, trained over at least two drums, for transporting an article to be coated, and at least one cleaning unit operatively connected to the conveyor unit for wiping a surface of the conveyor belt clean, with the cleaning unit including an endless wiping belt extending obliquely relative to the conveyor belt and so operated as to run at a higher speed than the conveyor belt when contacting the conveyor belt.

In accordance with the present invention, the wiping belt forms a main part of the cleaning device and has a width which is substantially smaller than the width of the conveyor belt. Guidance of the wiping belt requires few and simple components. As a consequence of the slanted disposition of the wiping belt relative to the rotation axes of the drums of the conveyor belt and the operation of the wiping belt at a higher speed than the conveyor belt, a speed component is realized which is directed to the outer edge of the wiping belt so that paint is removed from the conveyor belt by the continuously revolving wiping belt and laterally discharged in a quickest possible manner, without requiring the provision of an additional gutter or additional mechanical slides. The crossing pattern between the travel directions of the conveyor belt and the wiping belt results in an abrasive action which allows processing of even highly viscous paints while still accomplishing a thorough and superior cleaning of the conveyor belt, and yet is small enough so not to cause attrition of the conveyor belt and of the wiping belt.

According to another feature of the present invention, the wiping belt of the cleaning unit is associated to a drum for the conveyor belt and/or a sliding shoe deflecting the conveyor belt. Thus, a fixed abutment for the wiping belt is realized that promotes the cleaning effect as a deflection of the conveyor belt is thereby prevented. The overall configuration can be further minimized when this drum is the trailing one of the two drums as viewed in traveling direction of the upper strand of the conveyor unit, because the conveyor belt can then be cleaned immediately and easily after removing the spray-coated article as the paint sprayed onto the conveyor belt has not yet dried to a substantial extent. Also, the association of the wiping belt to the drum of the conveyor belt trailing provides also good access to the wiping belt to carry out maintenance and cleaning works.

Suitably, the wiping belt has a side edge which extends at an acute angle of approximately 10 degrees, preferably 7 degrees, to an axis which runs perpendicular to a side edge of the conveyor belt. This angular disposition ensures in conjunction with a suitably selected relatively high traveling speed of the wiping belt a secure removal of paint from the conveyor belt while still keeping the width of the wiping belt comparably small. To prevent a lateral run-off of paint from the wiping belt, it is suitable to incline the wiping belt by a small angle of e.g. 2 to 3 degrees with respect to the horizontal so that the outer conveyor belt distal side edge of the wiping belt is disposed at an elevated level with respect to the inner conveyor belt proximal side edge. A deflection of the conveyor belt contacting upper strand of the wiping belt relative to the conveyor belt can be avoided by supporting the upper strand of the wiping belt on a stationary carrier plate. The carrier plate is formed in its surface, which confronts the upper strand of the wiping belt, with a groove which extends in spaced and parallel disposition to the boundary edges of the upper strand and has a variable distance to the side edges of the carrier plate as a result of the slanted orientation of the groove with respect to the longitudinal edges of the carrier plate. The groove may extend on both sides of the vertical projection of the rotation axis of the pertaining belt-reversing roller, so that the upper strand of the wiping belt slightly embraces the conveyor belt being cleaned, thereby realizing a flat engagement between the wiping belt and the conveyor belt.

According to yet another feature of the present invention, the wiping belt is trained over a trailing first roller, when viewed in moving direction of the upper strand, and over a second roller which is positioned underneath the first roller, with a doctor blade positioned between the first and second rollers for removing paint, scraped off the conveyor belt, from the wiping belt. The downward travel of the wiping belt via the second roller is advantageous as the wiping belt projects beyond the conveyor belt only insignificantly, and gravity can be exploited to enhance the scrape-off action on the wiping belt. This action can be further reinforced when the second roller is in offset disposition with respect to the trailing first roller in the direction to a leading third roller, and when providing the doctor blade of single piece configuration with a V-shaped profile, with the pointed end disposed in front, when viewed in traveling direction of the wiping belt. In this manner, paint converging in the center of the wiping belt can then be directly conducted into a collecting tank under the action of gravity, without requiring any additional structural components.

According to another embodiment of the present invention, the conveyor belt and the wiping belt may travel in horizontal direction, i.e. the drums of the conveyor belt and the rollers of the wiping belt are supported on horizontal axes, with the wiping belt suitably positioned underneath the trailing roller. It is, however, also conceivable to position the conveyor belt in a vertical disposition, with the drums supported on horizontal axes, whereby the wiping belt is configured in correspondence to the previous embodiments. Suitably, the roller associated to the wiping belt extends within the respective projection of the outer contour of the wiping belt.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
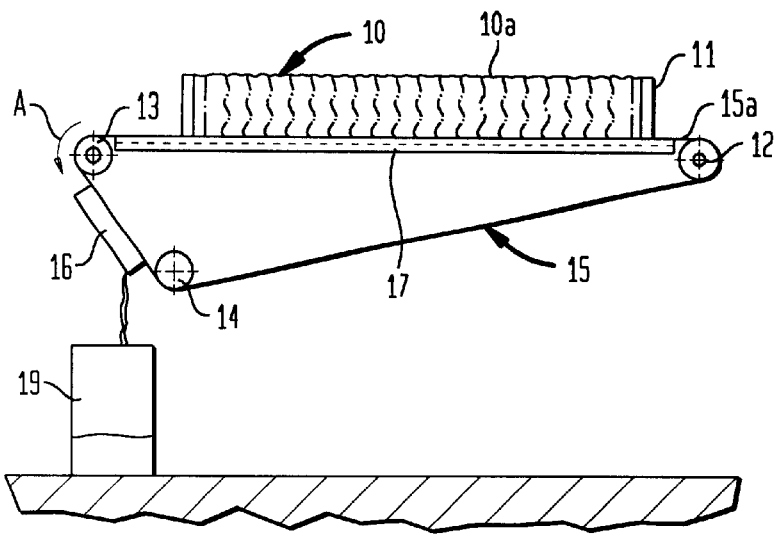
FIG. 1 is a schematic, fragmentary illustration of a first embodiment of a paint spraying apparatus according to the present invention, showing only in detail a cleaning unit for scraping off paint from a conveyor belt.

Throughout all the Figures, same or corresponding elements are generally indicated by same reference numerals.

Figure 3:
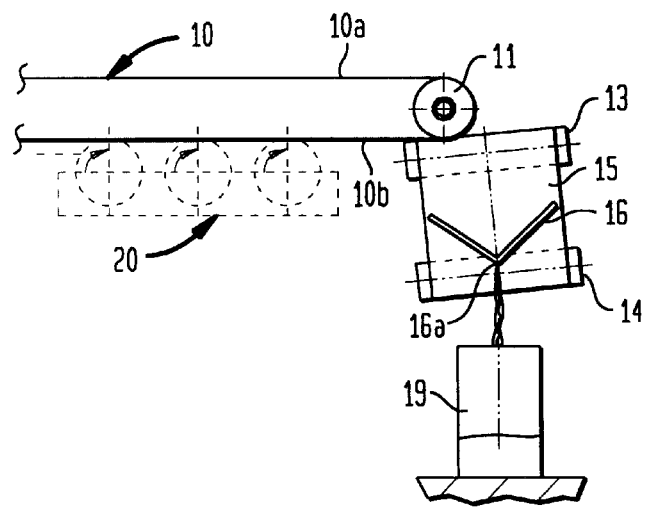
FIG. 3 is a side view of the paint spraying apparatus of FIG. 1.

Turning now to the drawing, and in particular to FIG. 1, there is shown a schematic, fragmentary illustration of a first embodiment of a paint spraying apparatus according to the present invention. For the sake of simplicity, the paint spraying apparatus will be described hereinafter only in connection with those parts that are necessary for the understanding of the present invention. The paint spraying apparatus includes a conveyor belt 10 which has an upper strand 10a for transport of articles (not shown) along spray guns (not shown) for spray coating the articles with paint, and a lower strand 10b (FIG. 3). The conveyor belt 10 is trained over at least two drums of which only the upstream or trailing drum 11, as viewed in traveling direction of the upper strand 10a, is shown. Positioned underneath the drum 11 is a cleaning unit for wiping paint off the conveyor belt 10. The cleaning unit includes a wiping belt 15 which is trained over three rollers 12, 13, 14 for traveling in a traveling direction indicated by arrow A, and has a width $W_1$, which is substantially smaller than a width $W_2$ of the conveyor belt 10. The wiping belt 15 has an upper strand 15a which, as viewed in traveling direction A, is supported on a fixed carrier plate 17 and extends horizontally between the leading roller 12 and the trailing roller 13 and is deflected downward by the trailing roller 13 in the direction of the roller 14. The roller 14 is positioned underneath the trailing roller 13 and offset in the direction of the leading roller 12 so that the wiping belt 15 travels slantingly downwards in the zone between the rollers 13 and 14. Acting in this zone between the rollers 13, 14 is a doctor blade 16 for scraping off paint from the wiping belt 15.

Figure 2:
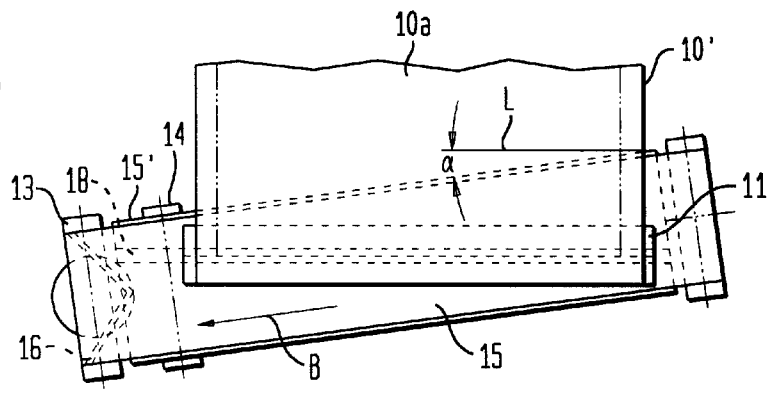
FIG. 2 is a top view of the paint spraying apparatus of FIG. 1.

As shown in FIG. 2, the wiping belt 15 is positioned at an angle with respect to the conveyor belt 10, whereby a side edge 15' of the wiping belt 15 defines an acute angle α of approximately 10°, preferably 7° with an imaginary axis L which extends perpendicular from an intersection between a side edge 10' of the conveyor belt 10 and the side edge 15' of the wiping belt 15. The slanted disposition of the wiping belt 15 is so selected that the trailing drum 11 of the conveyor belt 10 lies within an outline of the wiping belt 15. The wiping belt 15 is positioned underneath the trailing drum 11 so that a contact with the conveyor belt 10 is established.

During spray-coating of articles, the surface of the conveyor belt 10 becomes partially contaminated with paint, as indicated in FIG. 1. This overspray is removed by the wiping belt 15 which is so operated as to travel at a higher speed than the conveyor belt 10 so that the overspray is scraped off by the side edge 15' and transferred onto the wiping belt 15 from where the overspray is transported in direction of arrow B for lateral discharge. According to a nonlimiting example, the wiping belt 15 may travel at a speed of 80 m/min, whereas the conveyor belt 10 may travel at a speed of 5 m/min, so that the speed ratio is 1:16. Persons skilled in the art will understand, however, that the stated speeds and stated speed ratio is provided by way of example only, and may deviate therefrom, e.g. the wiping belt 15 may be operated at a speed of 100 m/min and the conveyor belt 10 may be operated at a speed of 1 m/min. Thus, the speeds of the wiping belt 15 and the conveyor belt 10 may vary to a wide extent, whereby the applied speed for the wiping belt 15 is limited only by the consideration to prevent a hurling off of scraped-off paint from the wiping belt 15 due to centrifugal forces.

A deflection of the wiping belt 15 is prevented by the support of the upper strand 15a upon the carrier plate 17. On its side confronting the upper strand 15a of the wiping belt 15, the carrier plate 17 is formed with a continuous groove 18 which extends vertically below the rotation axis of the drum 11 so that the upper strand 15a of the wiping belt 15 slightly embraces the conveyor belt 10 by a small angle to thereby enhance the cleaning action. The drives for the wiping belt 15 and the conveyor belt 10 to operate the wiping belt 15 at a higher speed than the conveyor belt 10 are not shown in detail in the drawing for the sake of simplicity.

Referring now to FIG. 3, it can be seen that the doctor blade 16 located in the downward zone of the wiping belt 15 between the rollers 13, 14 has a substantially V shaped configuration, with the pointed end 16a directed forward, as viewed in the traveling direction B of the wiping belt 15. As a result of gravitational forces, scraped off paint flows directly into a tank 19 which is disposed beneath the doctor blade 16 so that the provision of separate baffles or deflectors or particular removal devices is unnecessary.

FIG. 3 further shows the provision of an additional after-cleaning device 20 for cleaning the lower strand 10b of the conveyor belt 10. The after-cleaning device 20 includes essentially three drums which rotate in opposition to the traveling direction of the lower strand 10b of the conveyor belt 10. Persons skilled in the art will understand that the application of cleaning agents may certainly applied as well for cleaning the lower strand 10b.

Figure 4:
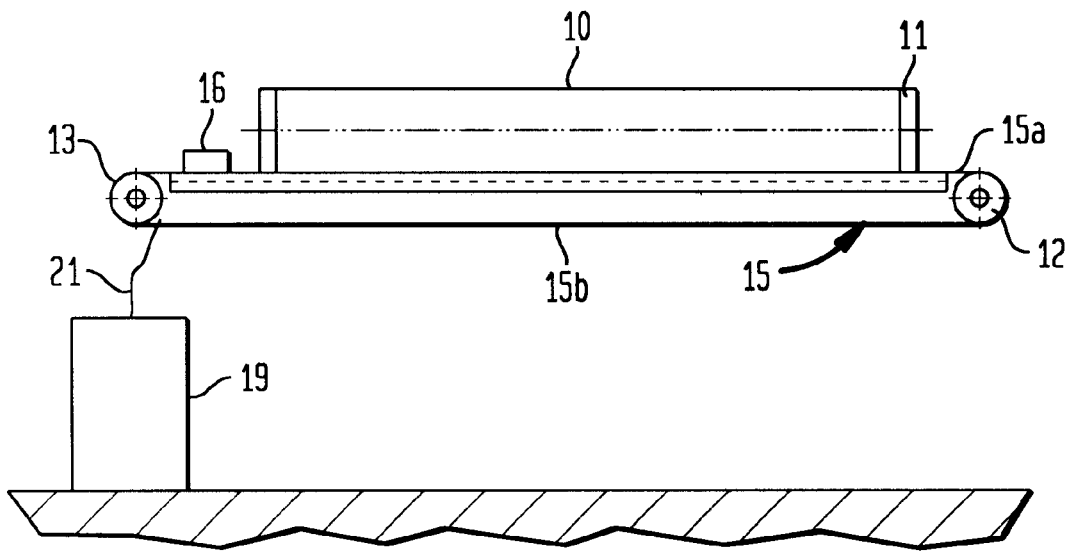
FIG. 4 is a schematic, fragmentary illustration of a second embodiment of a paint spraying apparatus according to the present invention.
Figure 5:
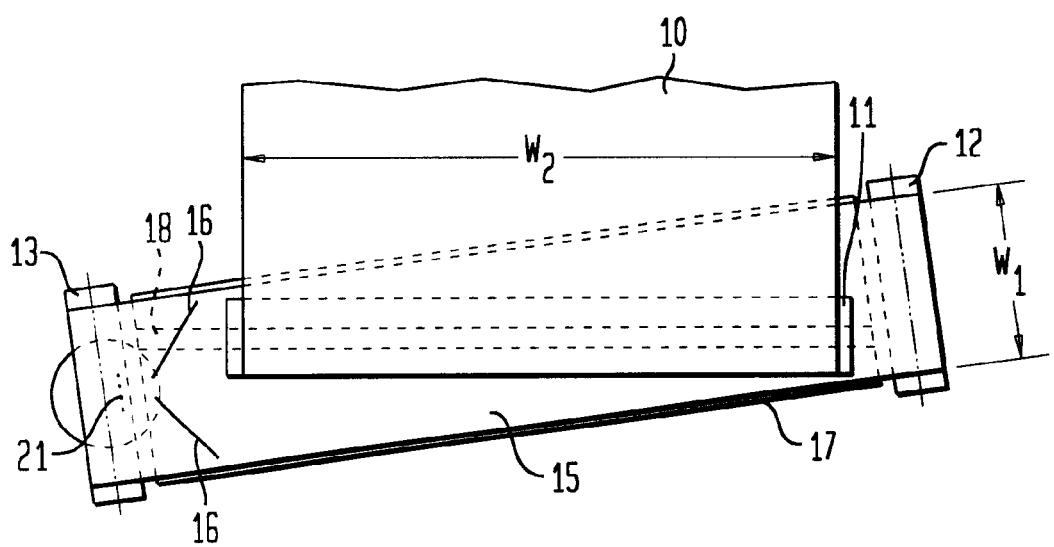
FIG. 5 is a top view of the paint spraying apparatus of FIG. 4.

Turning now to FIG. 4, there is shown a schematic, fragmentary illustration of a second embodiment of a paint spraying apparatus according to the present invention. Parts corresponding with those in FIG. 1 are denoted by identical reference numerals and not explained again. In this embodiment, the wiping belt 15 is trained about only two rollers 12, 13 and disposed at an angle with respect to the conveyor belt 10, in a same manner as described in the previous embodiment. In contrast to the embodiment of FIGS. 1 to 3, the doctor blade 16 is open in the middle, as shown in FIG. 5, so that removed paint forms a trail. A stripper 21 is in cooperating relation with the lower strand 15b of the wiping belt 15 for scraping off paint from the wiping belt 15 and transport thereof to the tank 19. The slanted disposition of the wiping belt 15 and the difference in speed between the wiping belt 15 and the conveyor belt 21 corresponds to the configuration of the paint spraying apparatus of FIGS. 1 to 3.

Figure 6:
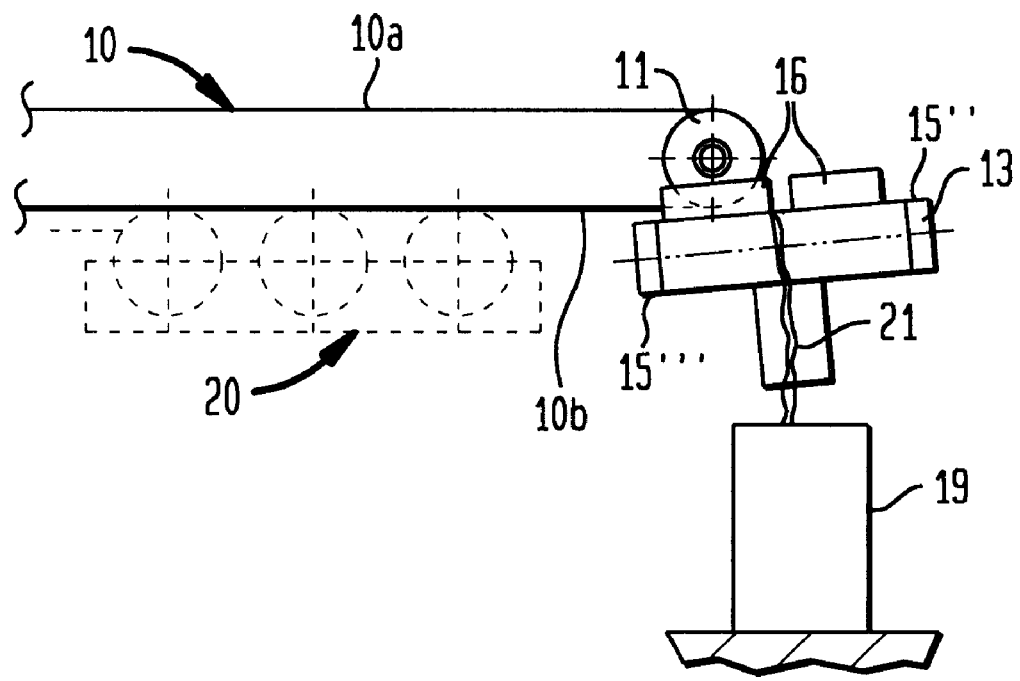
FIG. 6 is a side view of the paint spraying apparatus of FIG. 4.

As shown in FIG. 6, the wiping belt 15 is inclined with respect to the horizontal by a relative small angle, e.g. in the range between 1° and 30°, preferably 5°, so that the outer edge 15", which is distal to the drum 11, is at elevated level relative to the inner edge 15'". Through the slanted disposition of the wiping belt 15 relative to the drum 11 and the higher operating speed of the wiping belt 15 relative to the conveyor belt 10, paint wiped off the conveyor belt 10 is drawn in the direction to the outer edge 15" of the wiping belt 15. The slanted disposition of the wiping belt 15 prevents a lateral run-off of paint and creates, at the same time, a clearance angle between the lower strand 10b of the conveyor belt 10 and the upper strand 15a of the wiping belt 15 in the area of overlap. FIG. 6 further shows the provision of the after-cleaning device 20 for cleaning the lower strand 10b of the conveyor belt 10.

Figure 7:
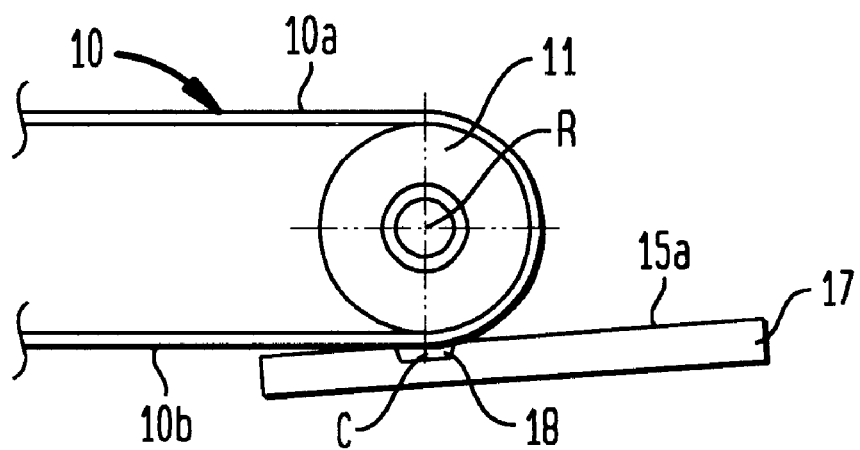
FIG. 7 is a schematic illustration of a carrier plate of a spray painting apparatus according to the present invention for support of the wiping belt of a cleaning unit.

Turning now to FIG. 7, there is shown a schematic illustration of the carrier plate 17 of a spray painting apparatus according to the present invention for support of the wiping belt 15, and shows in particular the continuous groove 18 which has a center axis C disposed vertically underneath the rotation axis R of the drum 11.

Figure 9:
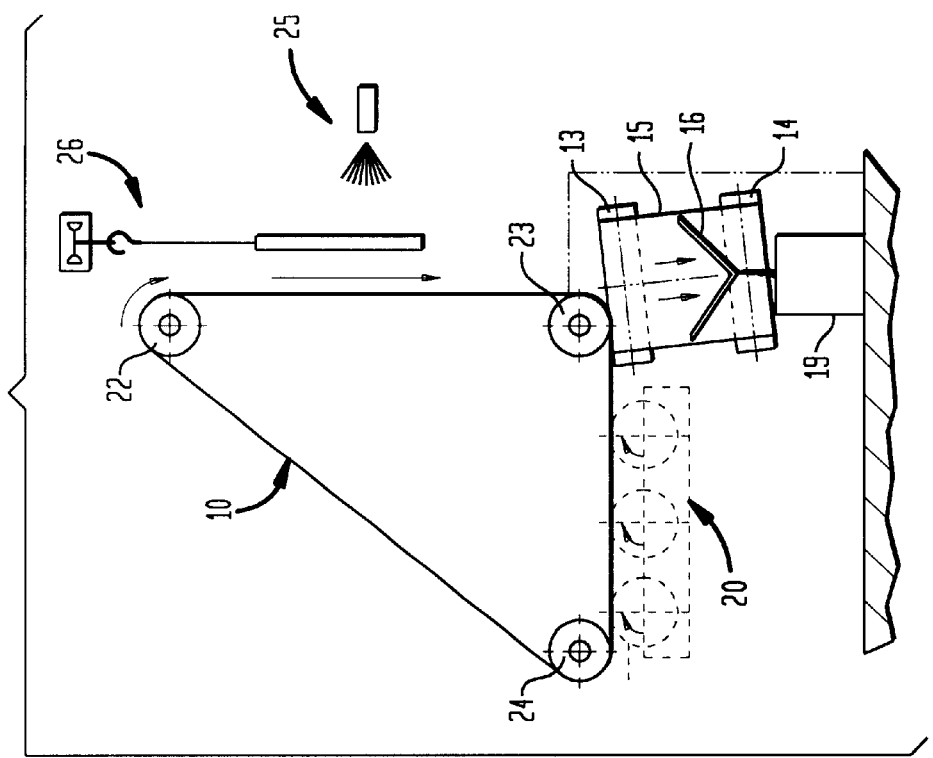
FIG. 9 is a side view of the paint spraying apparatus of FIG. 8.
Figure 8:
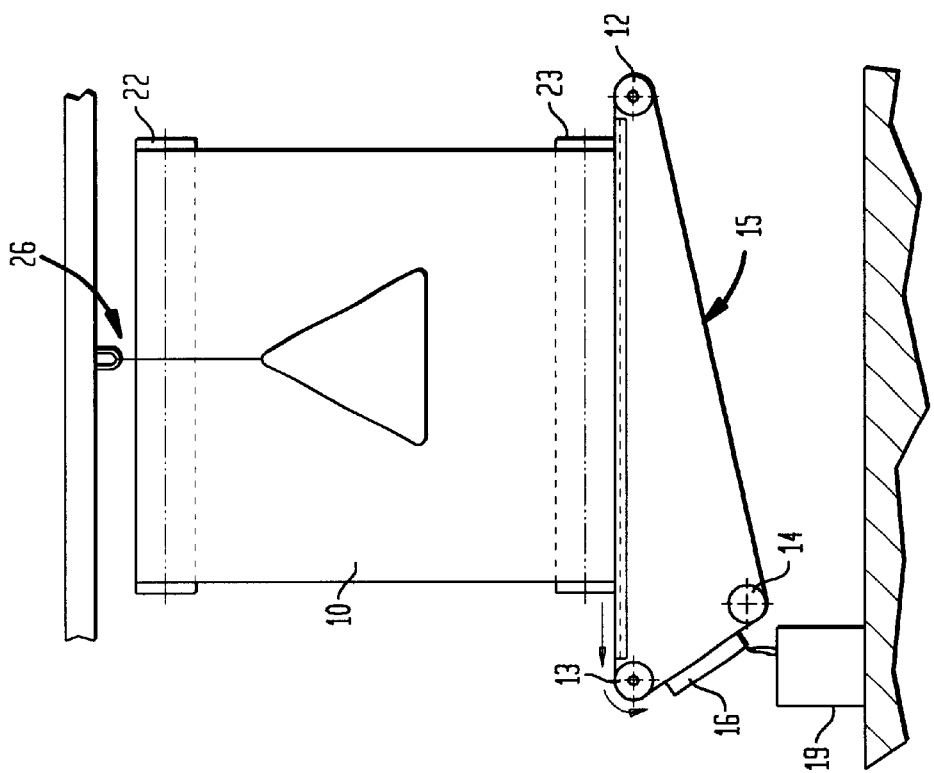
FIG. 8 is a schematic, fragmentary illustration of a third embodiment of a paint spraying apparatus according to the present invention.

FIG. 8 shows a schematic, fragmentary illustration of a third embodiment of a paint spraying apparatus according to the present invention. Parts corresponding with those in FIG. 1 are again denoted by identical reference numerals and not explained again. In this embodiment, provision is made to loop the conveyor belt 10 about three drums 22, 23, 24 which rotate about horizontal rotation axes. In contrast to the previous embodiments, the articles to be coated with paint are secured to a fixed mounting (not shown) and placed in front of the conveyor belt 10 or transported by a separate overhead conveyor, generally denoted by reference numeral 26, between the conveyor belt 10 and a sprayer 25 (spray guns), as best seen in FIG. 9. Thus, paint sprayed onto the conveyor belt 10, so-called overspray, is subsequently scraped off by the wiping belt 15. In this embodiment, the conveyor belt 10 operates more like a shield which picks up paint and is not used directly for conveying the articles past the sprayer 25. The wiping belt 15 is in cooperating relation with the roller 23 and corresponds to the configuration of FIGS. 1 to 3 and thus is not explained again. However, the wiping belt 15 may certainly be configured in a manner shown in FIGS. 4 and 5, i.e. trained about only two rollers.

Figure 10:
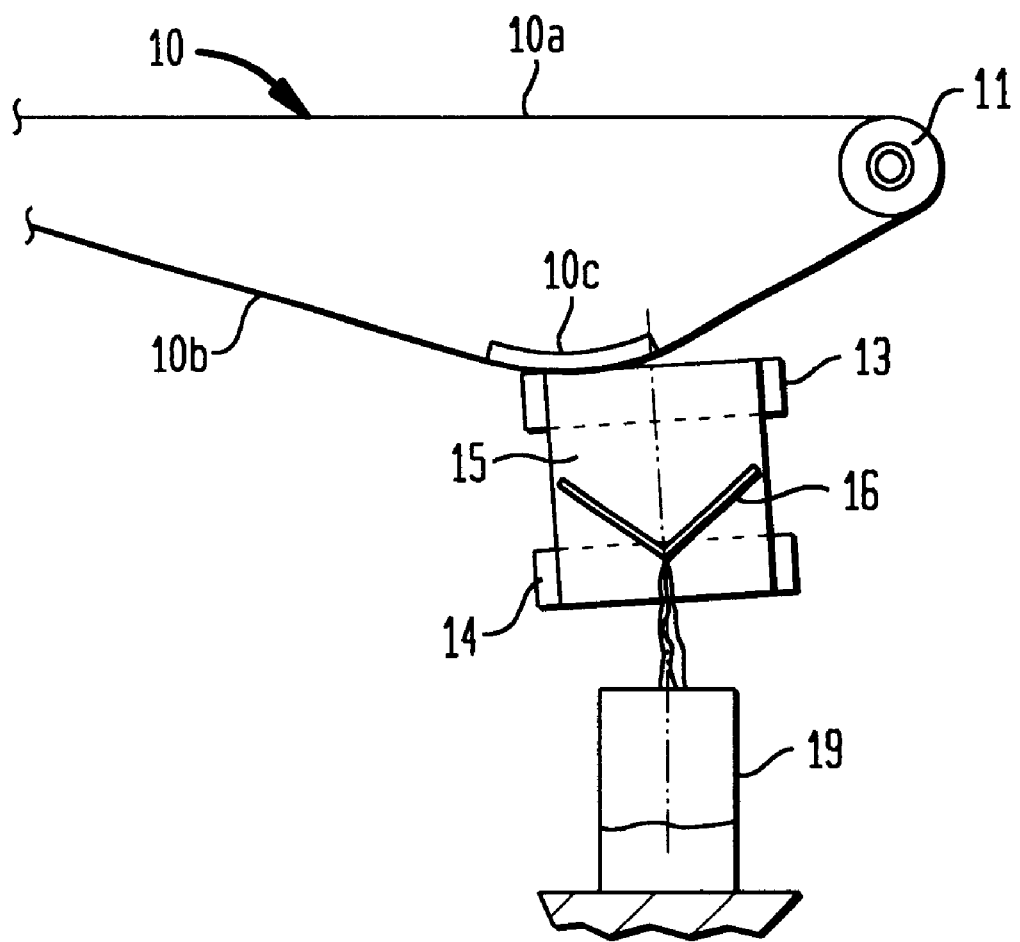
FIG. 10 is a schematic, fragmentary illustration of a fourth embodiment of a paint spraying apparatus according to the present invention.

FIG. 10 shows a schematic, fragmentary illustration of a fourth embodiment of a paint spraying apparatus according to the present invention, which differs from the previous embodiments by the provision of a fixed sliding shoe 10c in cooperating relationship with the wiping belt 15. The sliding shoe 10c is so configured as to deflect the conveyor belt 10.

While the invention has been illustrated and described as embodied in a spray painting apparatus, it is not intended to be limited to the details shown since various modifications and structural changes may be made without departing in any way from the spirit of the present invention.

What is claimed as new and desired to be protected by Letters Patent is set forth in the appended claims:

1. A paint spraying apparatus for coating an article with paint, comprising:
   a conveyor unit having an endless conveyor belt for transporting an article to be coated, wherein the conveyor belt is trained over at least two drums to move in a conveying direction, thereby defining a trailing drum and a leading drum; and
   at least one cleaning unit operatively connected to the conveyor unit for wiping a surface of the conveyor belt clean, said cleaning unit including an endless wiping belt defining in moving direction a center axis which extends obliquely at an angle relative to a rotation axis of the trailing drum for the conveyor belt, wherein the wiping belt is so operated as to revolve at a higher speed than the conveyor belt when contacting the conveyor belt.

2. The apparatus of claim 1 wherein the wiping belt is in cooperating relation with the trailing drum for the conveyor belt.

3. The apparatus of claim 1, and further comprising a sliding shoe for deflecting a lower strand of the conveyor belt, said wiping belt being in cooperating relation the sliding shoe.

4. The apparatus of claim 2 wherein the conveyor belt has an upper strand, said one of the belt-reversing drums representing the trailing one of the belt-reversing drums when viewed in moving direction of the upper strand of the conveyor belt.

5. The apparatus of claim 1 wherein the center axis of the wiping belt extends obliquely at an acute angle of approximately 10° with respect to the rotation axis of the trailing drum.

6. The apparatus of claim 5 wherein the acute angle is 7°.

7. The apparatus of claim 1 wherein the wiping belt has a conveyor belt distal outer edge and a conveyor belt proximal inner edge, said wiping belt being inclined with respect to a horizontal by a small angle such that the outer edge is disposed at an elevated level with respect to the inner edge.

8. The apparatus of claim 2 wherein the wiping belt has an upper strand in contact with the conveyor belt, and further comprising a stationary carrier plate, bounded by boundary edges, for supporting the upper strand of the wiping belt, said carrier plate having a surface which is in confronting relationship to the upper strand of the wiping belt and formed with a continuous groove extending in parallel relation to the boundary edges of the carrier plate and disposed on both sides of the vertical projection of the rotation axis of the trailing drum.

9. The apparatus of claim 1 wherein the wiping belt is trained in moving direction over a leading roller and a first trailing roller and over a second trailing roller which is positioned underneath the first roller, and further comprising a doctor blade positioned between the first and second rollers for removing paint from the wiping belt.

10. The apparatus of claim 9 wherein the second roller is in offset disposition with respect to the first roller in the direction to the leading roller, said doctor blade being configured in one piece and having a V-shaped configuration to define a pointed end which leads, when viewed in the moving direction of the wiping belt.

11. The apparatus of claim 1 wherein the conveyor belt and the wiping belt extend in substantial horizontal disposition, said wiping belt being positioned underneath the trailing drum which extends within a projection of the outer contour of the wiping belt.

12. The apparatus of claim 1, and further comprising a stationary suspension for placing the article in front of the conveyor belt, or an overhead conveyor for transporting the article in front of and along the conveyor belt, and a sprayer unit for coating the article with paint, said conveyor belt being trained over three said drums in horizontal disposition, with one of the drums representing a lower drum and facing the sprayer unit, said wiping belt acting on the lower drum.

13. The apparatus of claim 9, and further comprising an after-cleaning unit positioned downstream of the doctor blade.

* * * * *